E. M. DUDGEON.

HYDRAULIC-JACK.

No. 6,786. Reissued Dec. 7, 1875.

WITNESSES

Samil. H. Wheeler

Julius A. Haste

INVENTOR

Eneas M Dudgeon

N. PETERS, PHOTO-LITHOGRAPHER, WASHINGTON, D. C.

UNITED STATES PATENT OFFICE.

ENEAS M. DUDGEON, OF SAN FRANCISCO, CALIFORNIA.

IMPROVEMENT IN HYDRAULIC JACKS.

Specification forming part of Letters Patent No. 162,044, dated April 13, 1875; reissue No. 6,786, dated December 7, 1875; application filed June 22, 1875.

*To all whom it may concern:*

Be it known that I, ENEAS M. DUDGEON, of the city and county of San Francisco, in the State of California, have invented a certain Improvement in Force-Pumps; and I do hereby declare that the following is a full, clear, and exact description of the same, reference being had to the accompanying drawing forming part of this specification:

The invention consists, first, in the combination of a plunger and reciprocating ram-tube or hollow stem, as hereinafter described, whereby the water is passed through the plunger as the ram ascends or descends.

The accompanying drawing shows the application of the improvement to a hydraulic lifting-jack, in which the ram and head contain the fluid required to operate the jack.

The invention also consists in the combination, with a tubular pump-plunger, of valves adapted to pass the fluid from the reservoir to the cylinder, or in the opposite direction, by the reciprocating action of said plunger, produced by the force applied to the lever in operating the jack.

Figure 1:
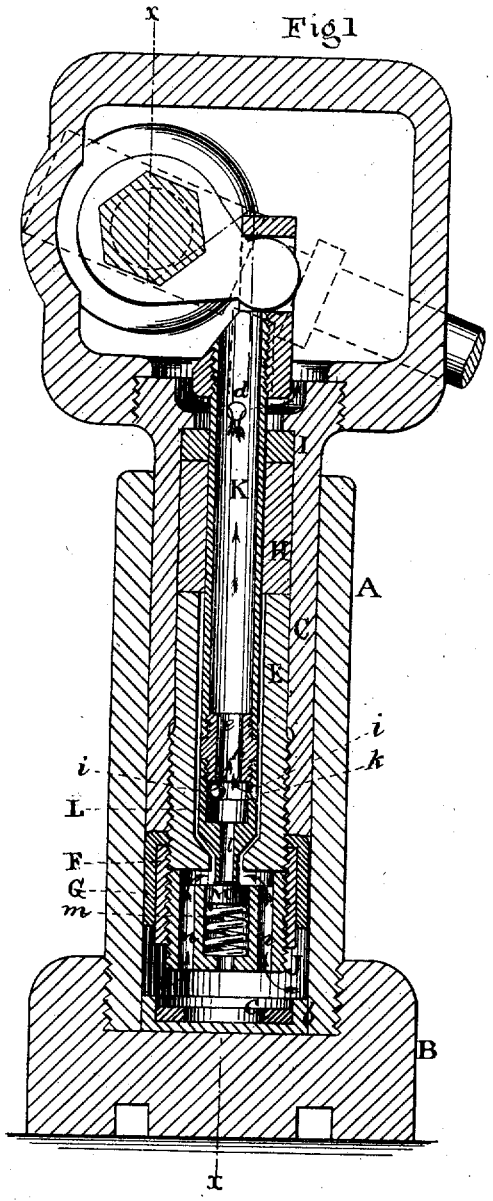
Figure 2:
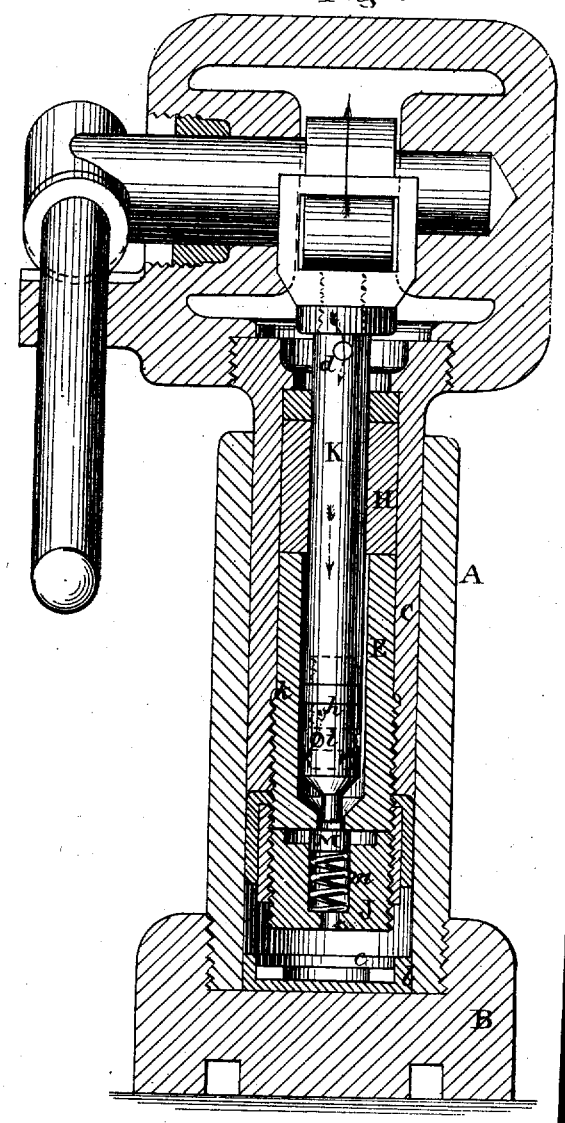
Figure 3:
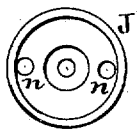

In the accompanying drawing, Figure 1 represents a vertical central section of a hydraulic lifting-jack constructed in accordance with my invention, with the lower valve open, and the fluid as returning to the reservoir. Fig. 2 is a vertical section on the irregular line *x x*, showing the lower valve closed, the fluid as descending through the pump-plunger to act upon the ram, and said plunger in a rising position. Fig. 3 is a top view of the lower valve-box with its passages.

A is the cylinder of the jack arranged to screw into a base, B. C is the ram connected at its upper end by screw-joint, or cast in one with the combined fluid-reservoir and head, forming part of the ram; E, the pump-barrel, screwed concentrically into the lower end of the ram C, and with the valve M, when shut, closing the lower end of the ram. F is a screw-coupling within a cup-packing, G, at the lower end of the ram serving to connect the valve-box and jam-screw J to the pump-barrel E; also to compress the packing G on the end of the ram. K is the tubular pump-plunger, which has a packing, H, retained between the ring I and the upper end of the pump-barrel E, the screwing in of the latter serving to set up the packing H round the plunger. The tubular pump-plunger K is in communication above the ring I by the side openings *d*, with the reservoir, and is provided with a valve, L, which works freely in a cage screwed to its lower end, and which valve when shut, by the resistance of the fluid, as the pump-plunger descends, shuts the passage through the length of the plunger, connecting the pump-chamber with the reservoir, and thus the fluid, in the barrel or chamber of the pump, is discharged through the lower valve M and passages *n n* in the jam-screw J into the cylinder A, causing the ram to rise at each discharge from the pump into the cylinder. As the plunger is raised the resistance of the fluid, its gravity, and the gravity of the valve L, keep it open, so that the fluid can freely pass from the reservoir by the side openings *d*, (of which there are two,) through central passage in the length of the pump-plunger, through the valve-seat of L and apertures or passages *t*, of which there are four in the plunger-valve cage, *h*, into the barrel of the pump, from which it is discharged, as above described, on the descent of the plunger.

The passage *l*, through the lower end of the valve-cage *h*, is for the action of the fluid to shut the valve as the plunger descends. As in all force-pumps, so in this, the reciprocating motion of the plunger and resistance of the fluid work the valves.

In the valve-box J is the valve M and spring *m*, the former of which, when the pump-plunger K is ascending, closes the aperture in the lower end of the pump-barrel E, as shown in Fig. 2, said valve being thus closed by the pressure of the fluid beneath it, assisted by the spring *m*, the spaces above and below said valve-box being connected by two or more through-passages, *n*.

In the operation of the pump-plunger—that is, when the jack is lifting—said plunger, at close of its descent, does not come in contact with the valve M, but only when it is required to lower the jack and return the liquid to the head or reservoir; then said plunger has a slightly-extended downstroke, so that the contracted end of its valve-box *h* may reach downward through the valve-seat of the lower valve M, opening it, and at the same time the valve M shutting tight the contracted aperture *l* in the lower end of said valve-box, as represented in Fig. 1. This makes the lower valve M operate as an egress-valve to return the liquid in the cylinder, through the apertures *n*, into the pump-barrel E, and through openings *i* and valve-seat of the valve at L, (the upper or plunger valve L being now open by its own gravity, and the liquid below it prevented from forcing it to shut as the passage *l* is shut by contact with the valve M, which is ground on it, forming a joint,) and thus the liquid is returned from the cylinder to the reservoir. When the jack is lifting, however, the lower valve M is only opened as each pump-barrel full is discharged from the pump, through the seat of said valve M and passages *n*, into the cylinder, the action of the valves L and M being alternate, in connection with the passages *i*, *k*, *l*, and *n*, and the reciprocating action of the plunger, as required in raising a weight.

To thus vary the length of the downstroke of the pump-plunger its operating lever has a collar, which, when the jack is lifting, comes in contact with a stop on the side of the head or reservoir, so that the lower end of the valve-box on the lower end of the plunger cannot strike the valve M. When, however, it is required to lower the jack the said lever is slightly drawn out of its socket, so that the collar escapes the above-mentioned stop, thereby allowing the pump-plunger an increased descent. The socket, as in other hydraulic jacks, has attached to it a rock-shaft, working through the side of the lifting-head, and is provided with an arm, working inside of the head, to which the pump-plunger is connected.

By means of the hollow or tubular pump-plunger, valves, and passages, as described, compactness, simplicity, and durability are attained, and an effective action of the ram is produced. Thus, the pump-plunger may be as readily packed as that of any force-pump, and a much smaller plunger than is usually used in hydraulic jacks may be made, and quite substantially, in this way, thus concentrating power, so that a jack to lift ten tons may be made with cylinder same bore as the present four-ton jack, as now made; also, the greatest facility is afforded for getting at the several working parts, valves, packings, &c., when necessary for repair or otherwise. Either leather or Babbitt metal cone-packings may be used for the pump-plunger packing.

I claim—

1. The combination, with the reciprocating ram, tube, or shell, C, working in cylinder A, of a tubular pump-plunger contained therein, whereby the operating fluid is passed through said plunger, in the manner described, for the purpose specified.

2. The combination, with the hollow pump-plunger K and pump-barrel E within the ram, packed as aforesaid, of the valves L M, and the apertures or passages *i l n*, substantially as specified.

3. The hollow pump-plunger K, made to extend through the bottom of the pump-barrel, in combination with the lower valve M, essentially as and for the purpose herein set forth.

4. The valve-box J, having a central cavity with parallel sides to hold and guide the spring-valve *m*, and cut out or chambered at its upper end to form the water-space between said cavity and the pump-barrel, as shown and described.

In witness whereof I have hereunto set my hand and affixed my seal this 13th day of March, A. D. 1875.

ENEAS M. DUDGEON. [L. S.]

Witnesses:
P. G. WOOD,
WM. ROLLINS.